United States Patent [19]
Sumiya et al.

[11] Patent Number: 5,676,595
[45] Date of Patent: Oct. 14, 1997

[54] AIR DUCT SELECTOR AND AUTOMOTIVE AIR CONDITIONER

[75] Inventors: Yasuhiko Sumiya, Hekinan; Tomohiro Kamiya, Takahama; Kazuma Inagaki, Hekinan, all of Japan

[73] Assignee: Nippondenso Co., Ltd., Kariya, Japan

[21] Appl. No.: 594,410

[22] Filed: Jan. 31, 1996

[30] Foreign Application Priority Data

Feb. 3, 1995 [JP] Japan .................................. 7-017072
Sep. 6, 1995 [JP] Japan .................................. 7-228964

[51] Int. Cl.$^6$ .................................................. B60H 1/26
[52] U.S. Cl. .................................................. 454/121
[58] Field of Search .................................. 454/121, 126

[56] References Cited

U.S. PATENT DOCUMENTS

| | | | |
|---|---|---|---|
| 5,062,352 | 11/1991 | Ostrand | 454/121 |
| 5,326,315 | 7/1994 | Inoue et al. | 454/126 |
| 5,564,979 | 10/1996 | Sumiya et al. | 454/121 |

FOREIGN PATENT DOCUMENTS

| | | |
|---|---|---|
| 423778 | 4/1991 | European Pat. Off. . |
| 681934 | 11/1995 | European Pat. Off. . |
| 3-15208 | 2/1991 | Japan . |

*Primary Examiner*—Harold Joyce
*Attorney, Agent, or Firm*—Cushman, Darby & Cushman IP Group of Pillsbury Madison & Sutro LLP

[57] ABSTRACT

An automotive air conditioner includes a casing, a rotary shaft rotatably supported in the casing, a rotary door connected to the rotary shaft and formed in a substantially arcuate shape, and drive means for rotating the rotary shaft. The rotary door includes a first opening defined by circumferential open ends, and a second opening defined by an arcuate circumferential wall. The casing includes a third opening, a fourth opening, and a fifth opening formed in a downstream end thereof and contiguously arranged along a circumferential surface of the rotary door. Opening areas of the third, fourth and fifth openings are adjusted by the rotary door. When the rotary door is rotated in a direction from the fifth opening toward the third opening and in a predetermined rotated position where one of the circumferential ends of the circumferential wall located at a rear end of the rotary door passes at least part of the fifth opening and opens the fifth opening, an air flows into the second opening and is directed toward the fifth opening through the first opening.

14 Claims, 14 Drawing Sheets

5,676,595

AIR DUCT SELECTOR AND AUTOMOTIVE AIR CONDITIONER

BACKGROUND OF THE INVENTION

1. Field of the Invention

The present invention relates to an air duct selector, and more particularly, to an automotive air conditioner including an arcuate rotary door for selectively opening and closing air ducts.

2. Description of Related Art

A conventional apparatus including a generally arcuate rotary door for selectively opening and closing air ducts is disclosed, for example, in Japanese Utility Model laid-open publication No. Hei 3-15208. Specifically, a generally arcuate rotary door includes an opening at a circumferential wall thereof. The rotary door is mounted within a cylindrical air conditioner duct. The duct includes a face air duct, a foot air duct and a defroster air duct contiguously juxtaposed with each other. A desired blow mode is selected by rotating the rotary door.

However, the conventional apparatus disclosed in Japanese Utility Model laid-open publication No. Hei 3-15208 includes the following problem. Specifically, each opening of the face air duct, the foot air duct and the defroster air duct, of the air conditioner duct, which face the circumferential wall of the rotary door, is too small. Therefore, the resistance to airflow is increased and a required amount of air can not be obtained.

To overcome this problem, the opening area may be enlarged along the peripheral surface of the air conditioner duct. However, if the open area is made larger, the rotary door closes part of the area of the air conditioner duct by itself, through which the air flows, while the rotary door is rotated from one end or the other end. This results in an increase in the resistance to airflow and a required amount of air is not obtained. Moreover, the rotary door may close an air passage within the air conditioner duct.

SUMMARY OF THE INVENTION

In view of the foregoing, it is an object of the present invention to provide an air duct selector and an automotive air conditioner with such an air duct selector, which substantially prevents an increase in the resistance to airflow when a substantially arcuate rotary door is rotated.

According to a first aspect of the present invention, an automotive air conditioner includes: a casing; a rotary shaft rotatably supported in the casing; a rotary door connected to the rotary shaft and formed in a substantially arcuate shape; and drive means for rotating the rotary shaft. The rotary door includes a first opening defined by circumferential open ends, and a second opening defined by an arcuate circumferential wall. The casing includes a third opening, a fourth opening, and a fifth opening formed in a downstream end thereof and contiguously arranged along a circumferential surface of the rotary door. Opening areas of the third, fourth and fifth openings are adjusted by the rotary door. When the rotary door is rotated in a direction from the fifth opening toward the third opening and in a predetermined rotated position where one of the circumferential ends of the circumferential wall located at a rear end of the rotary door passes at least part of the fifth opening and opens the fifth opening, an air flows into the second opening and is directed toward the fifth opening through the first opening.

When the rotary door is rotated in such a manner that the rear end of the circumferential wall opens at least part of the third or fifth opening, the air enters the second opening and is then directed toward the third or fifth opening through the first opening. That is, when the rotary door is in such a rotated position, the front end of the circumferential wall is rotated into a duct. The airflow area of the duct is gradually decreased.

However, the second opening is rotated into the duct 1 as the rotary door is rotated. The air thus enters the duct through this second opening and is directed toward the third or fifth opening through the first opening. In this way, the duct is not closed by the rotary door. The airflow resistance is prevented from being increased.

It is preferable that the maximum lengths of the third, fourth and fifth openings in the rotating direction of the rotary door be substantially equal to the maximum length of the second opening.

When the rotary door is rotated in such a manner that the conditioned air from the first opening flows through one of the third, fourth and fifth openings through the second opening, the selected one of the openings is aligned with the second opening. Thus, the air can flow through the entire area of this opening. There is no increase in the airflow resistance.

It is preferable that the circumferential wall of the rotary door be four times as long as the second opening in the rotating direction of the rotary door, the circumferential wall be divided into four sections between one end and the other end so as to include a first arcuate section and a second arcuate section from the one end, and the second opening be substantially formed on an entire surface of said second arcuate section.

When the rotary door is rotated to selectively open the third, fourth and fifth openings arranged in the rotating direction of the rotary door, either the third opening or the fifth opening located at either end is open, whereas the remaining two openings are closed by the continuous third and fourth arcuate sections. When the intermediate opening is open, the first and third arcuate sections close the third and fifth openings located at opposite ends. As a result, it is possible to reduce the overall length of the circumferential wall of the rotary door from one end to the other end, the size of the rotary door being thereby made smaller.

It is preferable that the third opening directing the conditioned air toward the lower part of the passenger seated in the passenger compartment, the fourth opening directing the conditioned air toward the upper part of the passenger, and the fifth opening directing the conditioned air toward the inner surface of the windshield.

The second opening of the rotary door is aligned with the fourth opening. The other part of the rotary door faces the fifth opening and closes the third and fifth opening. As described above, when either the third opening or fifth opening is open, the rotary door is driven so as to increase the airflow resistance. On the other hand, when only the fourth opening is open, most part of the rotary door is positioned to face the third, fourth and fifth openings, an increase in the airflow resistance being thereby prevented most favorably.

In the automotive air conditioner, the largest amount of air is required in a blow mode where an air is directed toward the upper part of the passenger. According to the above configuration, it is possible to give a large amount of the conditioned air toward the passenger so as to satisfy the requirement.

Further, it is preferable that the maximum length of the fifth opening in the rotating direction of the rotary door be greater than those of the third and fifth openings by a predetermined amount.

When the third opening is fully open, the total length of each maximum length of the fourth opening and the fifth opening is greater than the length of the circumferential wall of the rotary door which faces the fourth and fifth openings. Even when the third opening is fully open, the fifth opening is still slightly open.

In other words, when the second opening is fully open to direct an air toward the lower part of the passenger, the third opening is slightly open to direct an air toward the inner surface of a windshield glass. The foot air mode is selected typically when outside air temperature is low, and the windshield glass may be fogged. According to the above configuration, a slight amount of the conditioned air is directed toward the inner surface of the windshield glass, the windshield glass being thereby prevented from being fogged.

It is also preferable that an rotating angle of said rotary door from one end to the other end with said rotary shaft as a center be approximately 180 degrees. In this way, it is possible to maximize the opening area of the first opening for introducing the air and to reduce the airflow resistance.

Further, it is preferable that a guide portion being formed on the inner surface of the circumferential wall of the rotary door for partitioning a cool air passage and a warm air passage in a bilevel air mode where the rotary door opens both the third and fourth openings.

When the arcuate rotary door is driven to selectively open the first, second and third openings, an air within the duct, in most cases, flows into the rotary door. In the duct, a cool air from the cool air passage is well mixed with a warm air from the warm air passage within the rotary door. However, it is necessary for the automotive air conditioner to intentionally differentiate the temperature of an air from one of the first to third openings from the temperature of an air from one of the other openings. Especially, it is difficult to make such a temperature difference by the substantially arcuate rotary door. According to the above configuration, the guide portion partitions the cool air passage and the warm air passage to obtain the desired temperature difference.

Further, it is preferable that the guide portion extending in the same direction as the air flows into the rotary door when the second opening is positioned to open the fourth opening. In this way, it is possible to minimize the airflow resistance and to satisfy the comfortable feeling of the passenger when the conditioned air is directed toward the upper part of the passenger.

Still further, it is preferable that the guide member being integrally formed with the rotary door. In this way, it is possible to reduces the number of parts and production steps.

Still further, it is preferable that the rotary door being rotated with every equal amount to select a predetermined blow mode as a blow mode by operating selector lever provided in the passenger compartment with a control cable. In this way, the blow mode selector lever directly moves the rotary door with the control cable, the driving mechanism of the rotary door being thereby simplified.

BRIEF DESCRIPTION OF THE DRAWINGS

Other objects, features and characteristics of the present invention as well as the functions of related parts will become more apparent from a study of the following detailed description, the appended claims, and the drawings. In the accompanying drawings:

DETAIL DESCRIPTION OF THE PREFERRED EMBODIMENTS

Embodiments of the present invention will now be described with reference to the drawings.

Figure 1:
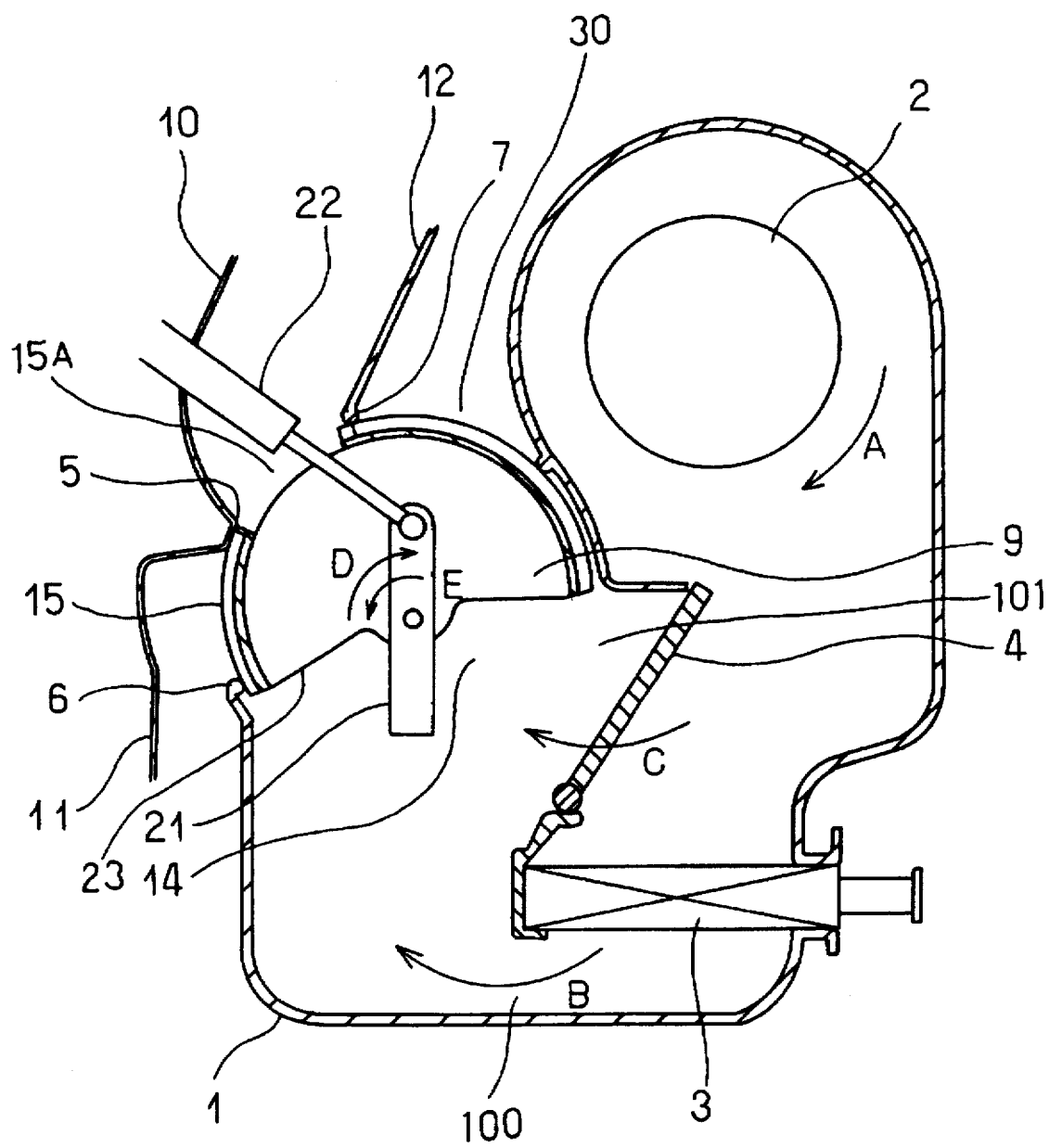
FIG. 1 is a partial schematic view of an automotive air conditioner according to a first embodiment of the present invention.

A first embodiment where the present invention is applied to an automotive air conditioner is described. Firstly, the overall structure of an air flow system is described. Referring to FIG. 1, a duct 1 includes a blower 2. The blower 2 is located in the upper right portion of the duct 1 and serves as an air supply means. An air inlet duct (not shown) is connected to the duct 1 to introduced air into the duct 1. The blower 2 feeds the air in the direction of the arrow A.

Although not shown, the air inlet duct is provided with an inside air inlet port and an outside air inlet port and includes a damper for selectively opening the inside air inlet port or the outside air inlet port. Also, an evaporator is provided within the air inlet duct. The evaporator serves as a cooling means in a refrigerating cycle.

As shown in FIG. 1, a heater core 3 as a heating means is located in the right and lower portion within the duct 1. An air mixing damper 4 is located at an upstream side of the heater core 3. An opening degree of the air mixing damper 4 is adjusted as required. After an air is introduced by the blower 2, the air mixing damper 4 adjusts an amount of the warm air flowing through a warm air passage 101, after passing through the heater core 3, in the direction of the arrow B and an amount of the other air flowing through a cool air passage 100 without passing through the heater core 3 in the direction of the arrow C. As shown in FIG. 1, the cool air passage 100 and the warm air passage 101 are vertically arranged. In most cases, the cool and warm airs are well mixed by a arcuate rotary door 9, which will be described later.

A plurality of openings, three openings of a third opening 6, a fourth opening 5, and a fifth opening 7, are formed in the left and upper portion of the duct 1 as shown in FIG. 1. The third opening 6, the fourth opening 5, and the fifth opening 7 are contiguously formed along the rotating direction of the rotary door 9. The third opening 6, the fourth opening 5, and the fifth opening 7 are elongated in a vertical direction with the sheet of FIG. 1 as a longitudinal direction thereof and have a substantially rectangular shape. The third opening 6 and the fourth opening 5 are substantially identical in shape and area. The fifth opening 7 has a width substantially identical to that of the third and fourth openings 6 and 5, but has a maximum length (maximum opening angle of the rotating direction of the rotary door 9 with a rotary shaft 16a as a center, which will be described later) slightly greater than that of the third and fourth openings 6 and 5. Thus, the area of the fifth opening 7 is slightly greater than that of the third and fourth openings 6 and 5.

The fourth opening 5 is communicated with a face air outlet (not shown) through a face air duct 10. The face air outlet is disposed in the passenger compartment of the vehicle and directs an air to the upper part of a passenger. The air which has passed through the fourth opening 5 is always discharged through the face air outlet. The third opening 6 is communicated with a foot air outlet (not shown) through a foot air duct 11. The foot air outlet is disposed in the passenger compartment of the vehicle and directs an air to the lower part of the passenger. The air which has passed through the third opening 6 is always discharged through the foot air outlet.

The fifth opening 7 is communicated with a defroster air outlet (not shown) through a defroster air duct 12. The defroster air outlet is disposed in the passenger compartment of the vehicle and directs air to the inner surface of glasses such as a windshield glass or a side glass (not shown). The air which has passed through the third opening 7 is always discharged through the defroster air outlet.

In this embodiment, the face air duct 10 and the foot air duct 12 has a common end wall. Therefore, the size of the automotive air conditioner is reduced and the area of the fourth and fifth openings 5 and 7 are enlarged.

When the blower 2 operates, an inside air or outside air flows through the air inlet duct and is directed into the duct 1 through the evaporator. The air flows within the duct 1 in the direction of the arrows A, B or C, and the temperature of the air is controlled in a set value. Then, the air flows through either the third opening 6, the fourth opening 5, or the fifth opening 7 and is discharged through each outlet. In this embodiment, five air supply operating modes can be selected by the third opening 6, the fourth opening 5 and the fifth opening 7, which will be described later in more detail.

An air duct selector 14 is disposed within the duct 1 to adjust the effective opening area of each of the third opening 6, the fourth opening 5, and the fifth opening 7. A structure of the air duct selector will be described in detail with reference to FIGS. 2 to 5.

The air duct selector 14 includes a rotary door 9 and a film element 15 which collectively form a rotary door section according to the present invention.

Figure 2:
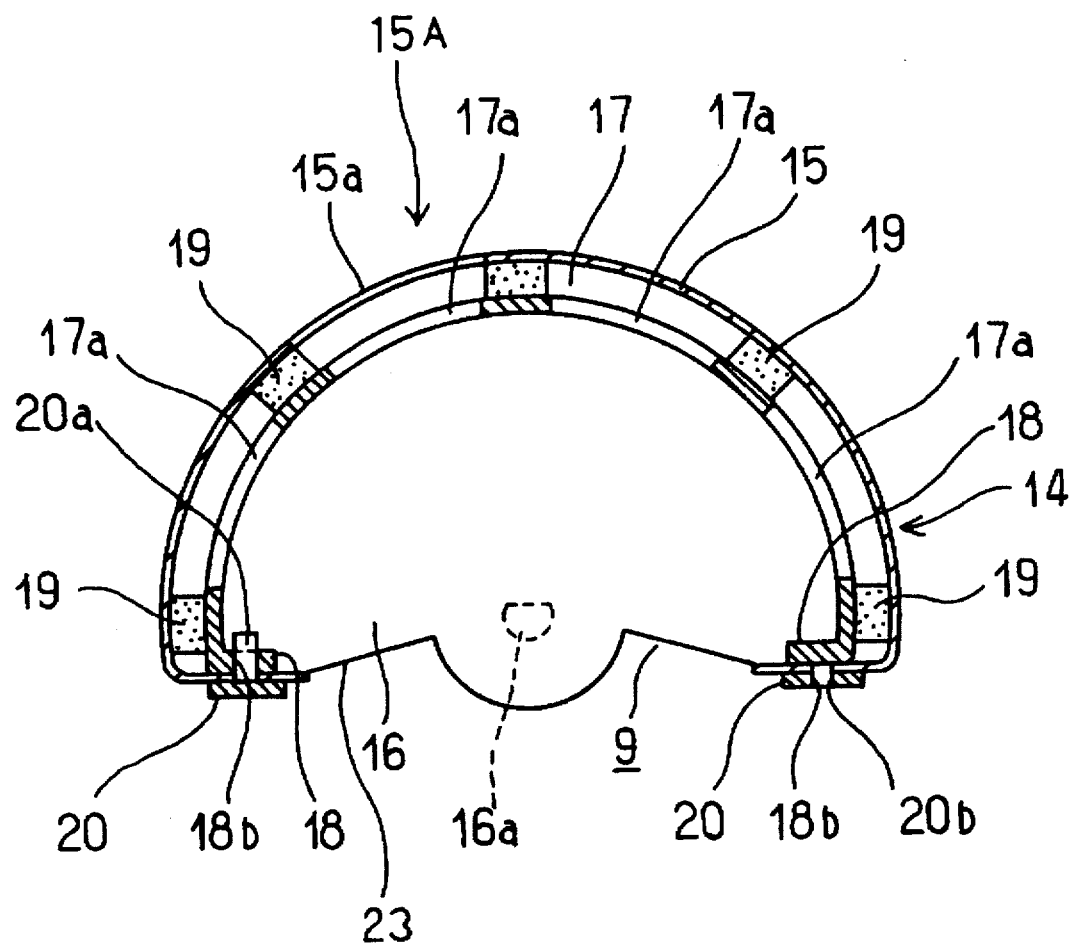
FIG. 2 is a vertical sectional side view of a rotary door.
Figure 3:
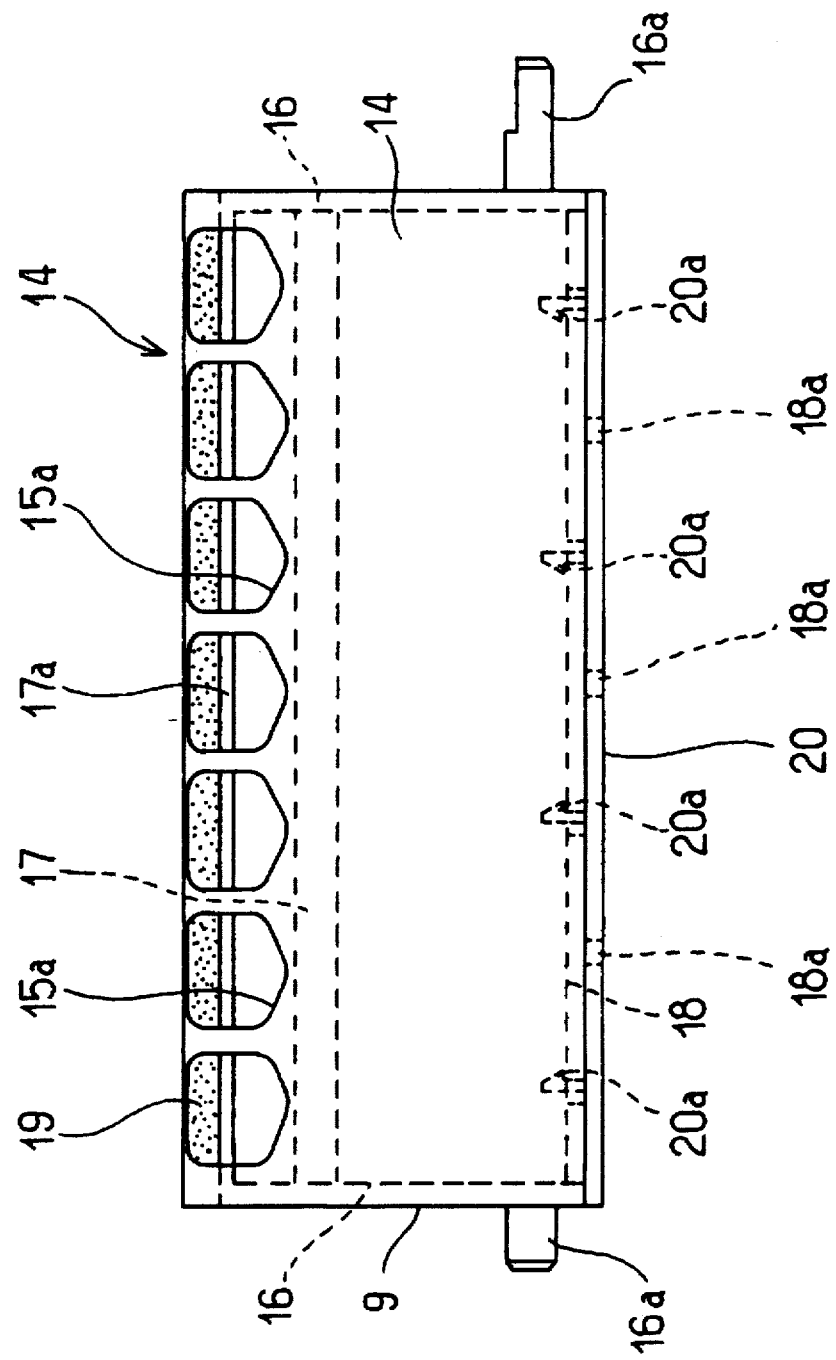
FIG. 3 is a front view of the rotary door.
Figure 4:
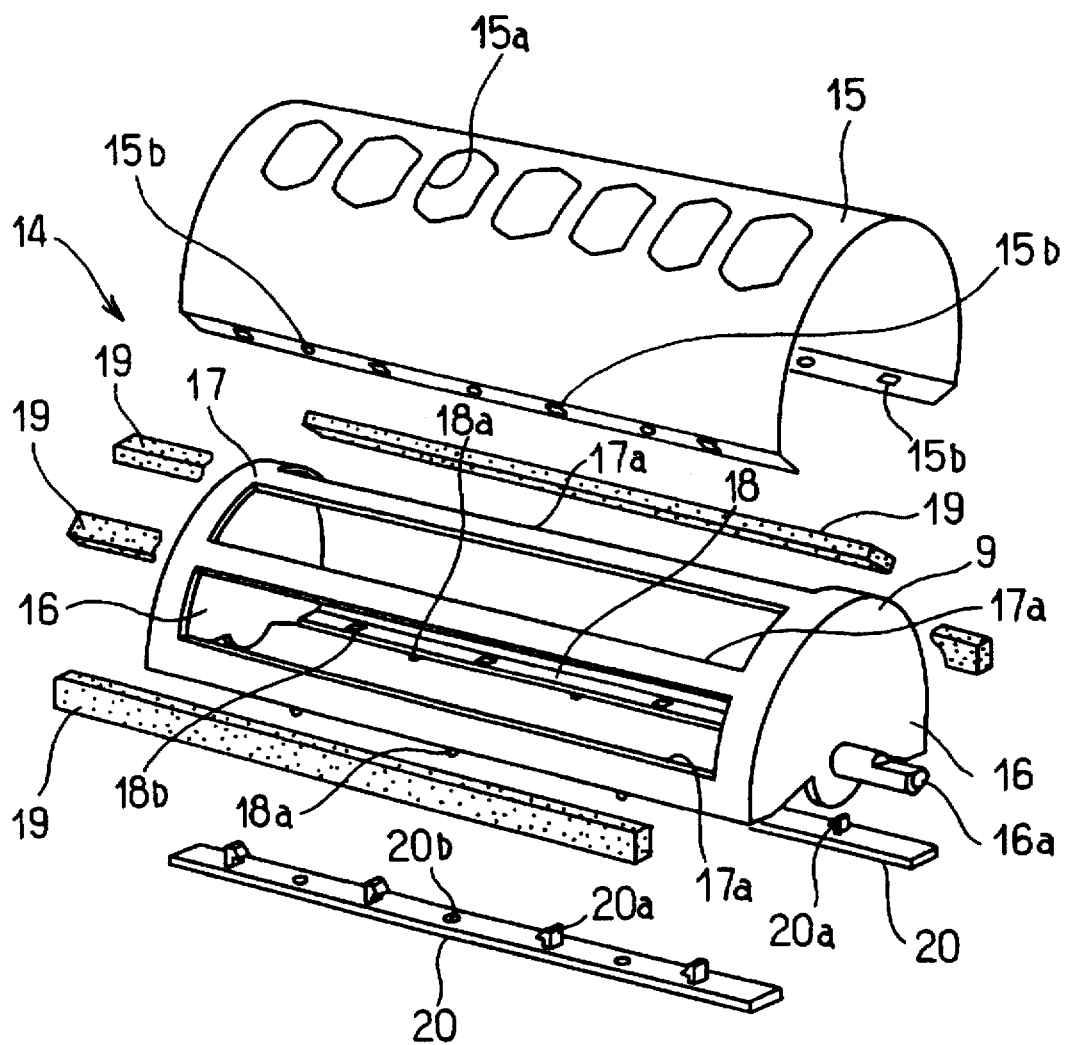
FIG. 4 is an exploded perspective view of the rotary door.

The rotary door 9 is made, for example, of plastic. As shown in FIGS. 2 to 4, the rotary door 9 is in the form of a half cylindrical shape, which is halved along a longitudinal direction, and includes integrally two substantially semicircular end plates 16 and an circumferential wall 17. Two rotary shafts 16a, extend axially outwardly from each end plate 16 and are located at the center of curvature of the circumferential wall 17.

As shown in FIG. 4, four elongated openings 17a are axially formed in the circumferential wall 17 and disposed circumferentially at equal intervals. The circumferential wall 17 includes five elongated ribs, two ribs at circumferential ends of the circumferential wall 17 and three ribs each between adjacent openings 17a, so that the other remaining portions form openings. As shown in FIG. 3, the rotary door 9 includes mounting portions 18 which extend radially inwardly from the circumferential ends of the circumferential wall 17 and are adapted to mount the film element 15, which will be described later. Each of these mount portions 18 includes several projections 18a and apertures 18b as partly shown in FIGS. 2 and 4.

Figure 5:
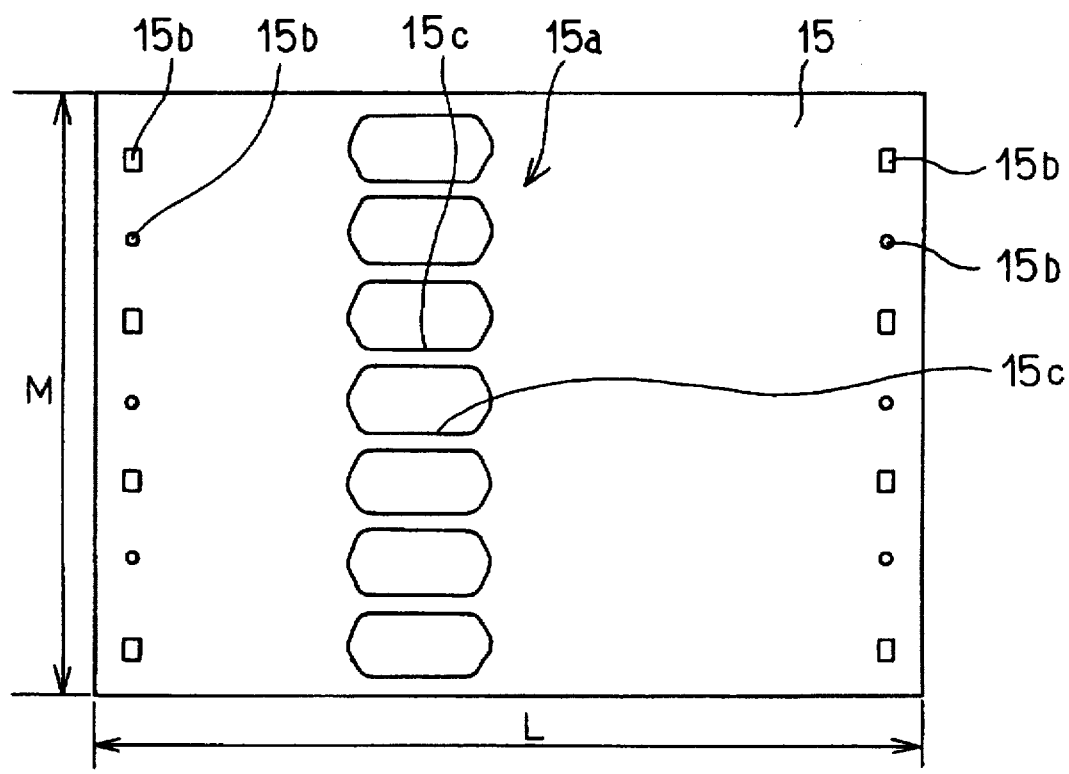
FIG. 5 shows the overall structure of a film element.

The film element 15 is flexible and impermeable, and has a low degree of frictional resistance. The film element 18 has a thickness of approximately 75 microns and is made, for example, of polyethylene terephthalate. As shown in FIG. 5, the film element 15 is generally rectangular and has a width M substantially equal to the axial length of the circumferential wall 17 of the rotary door 9. A plurality of airflow openings 15a are formed over the film element 15 along a longitudinal direction thereof and extend along the width of the film element 15.

In this embodiment, the airflow opening 15a is composed of a plurality of openings 15c. The openings 15c are arranged along the axis of the rotary door and have a generally hexagonal shape.

The opening 15a has a maximum length along the circumference of the rotary door 9. The maximum length of the opening 15a is substantially equal to the maximum width of each of the third opening 6 and the fourth opening 5 when the film element 15 is mounted on the rotary door 9.

The collective shape and area of the openings 15a are substantially equal to those of the fourth and third openings 5, 6 (Actually, the area of the openings 15a is slightly less than that of the third and fourth openings because an interconnecting portion exists between each adjacent openings 15c). As shown in FIG. 1, the airflow resistance is minimized when the rotary door 9 is positioned to open only the fourth opening 5 (face air mode), because the fourth opening 5 is aligned with the edge of the opening 15a. The airflow resistance is also minimized when the rotary door 9 is positioned to open only the third opening 6.

A plurality of apertures 15b are formed in each opposite side (in FIG. 5, right and left edges) of the film element 15. Specifically, the apertures 15b include circular apertures to which the projections 18a of the mounting portion 18 are fitted, and rectangular apertures aligned with the apertures 18b. The arcuate apertures and the rectangular apertures are alternately arranged.

The film element 15 is mounted on the outer surface of the circumferential wall 17 of the rotary door 9. To this end, a plurality of elongated resilient elements 19 are adhesively attached to the outer surface of the circumferential wall 17 as shown in FIGS. 2 and 4. The resilient elements 19 extend along two ribs at each opposite side of the circumferential wall 17 or extend axially along three ribs between each of adjacent openings 17a and are made, for example, from urethane foam. A pair of retainer plates 20 are also used to mount the film element 15 as shown in FIGS. 2 and 4. The retainer plate 20 is in the form of an elongated thin plate corresponding to a shape to the mounting portion 18. The retainer plate 20 includes pawls 20a firmly fitted within the corresponding apertures 18b of the mounting portion 18, and circular apertures 20b into which the corresponding projections 18a are fitted. The pawls 20a and the arcuate apertures 20b are alternately arranged along the retainer plate 20.

To mount the film element 15 on the rotary door 9, firstly, the film element 15 is placed over the outer surface of the circumferential wall 17 with its opposite sides bent inwardly as shown in FIG. 5. The projections 18a are fitted into the circular apertures 15b. The pawls 20a of the retainer plate 20 are inserted through the rectangular apertures 15b and then, engaged with the apertures 18b of the mounting portion 18, as shown in FIG. 2. In this way, both opposite side ends of the film element 15 are securely sandwiched between the mounting portions 18 and the retainer plates 20.

As shown in FIG. 5, the length L of the film element 15 is slightly greater than the total length of the hypothetical circumferential length of the outer circumferential surface of the resilient elements 19 plus the width of the opposite bent end portions. In this way, the film element 15 forms a curved shape along the circumferential wall 17 of the rotary door 9 by the resilient elements 19 while keeping a slight slack. Of the four openings 17a of the rotary door 9, the second opening 17a in a clockwise direction from the left end of the rotary door 9 in FIGS. 1 and 2 is aligned with the openings 15a of the film element 15, and the outside and inside of the rotary door 9 are communicated with each other through the openings 15a. The circumferential wall 17 and the film element 15 held on the circumferential wall 17 collectively form an circumferential wall section of the present invention.

The position of the openings 15a, 17a will be described in more detail. A circumferential wall section 30 is composed of the circumferential wall 17 and the film element 15 placed on the circumferential wall 17.

Figure 6:
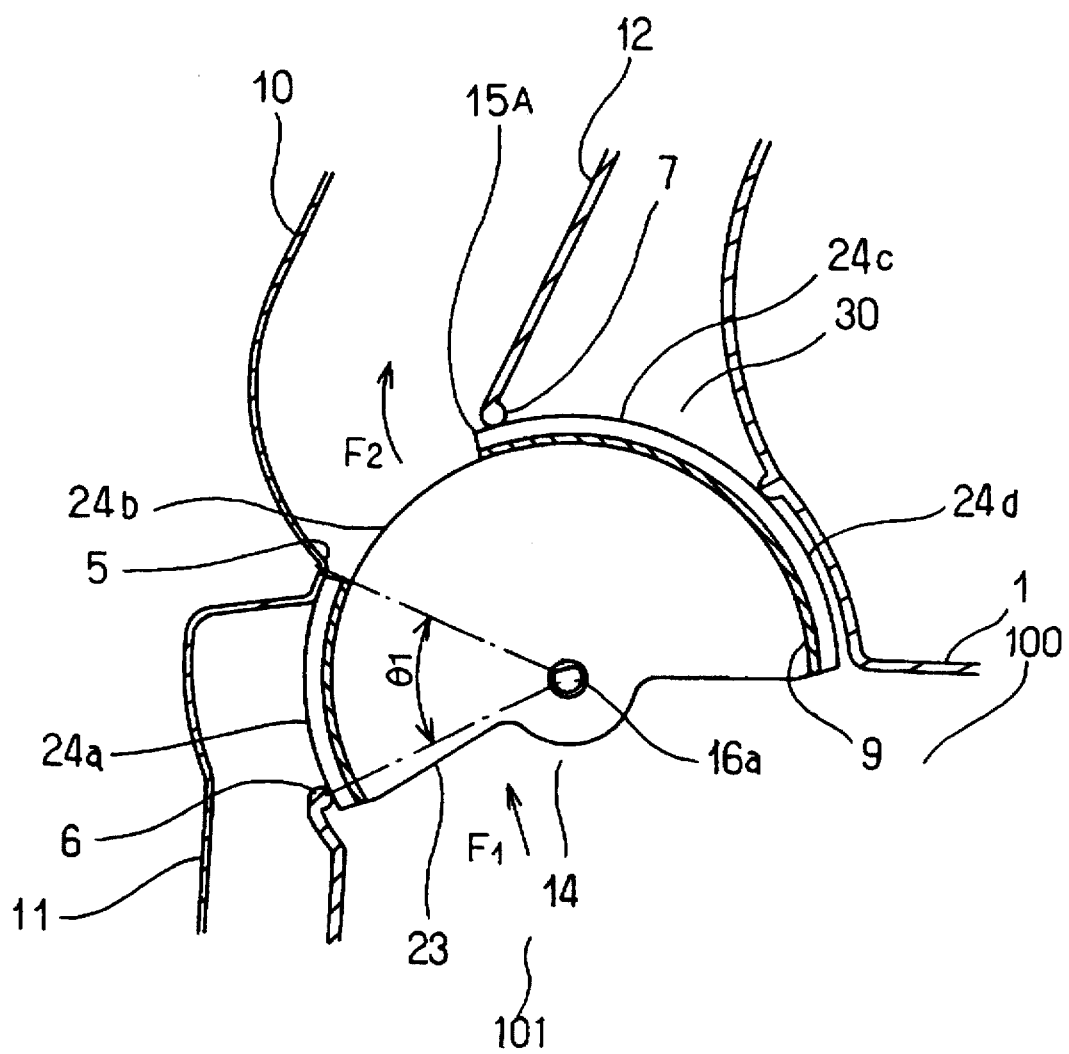
FIG. 6 is an operational view of an air duct selector in a face air mode.

As shown in FIG. 6, the circumferential wall section 30 extends in a rotating direction form one end to the other end by an angle of approximately 180 degrees with the rotary shaft 16a as a center. The circumferential length of the circumferential wall section 30 is approximately four times as long as the maximum length of the fourth and third openings 5 and 6.

The circumferential wall section 30 is divided into four sections in the rotating direction of the rotary door 9. A first arcuate section 24a is located at the left end of the rotary door 9 in a clockwise direction in FIG. 6. A second arcuate section 24b (corresponding in position to the opening 17a, see FIG. 1) is located at the right side of the first arcuate section 24a in a clockwise direction. The opening 17a and the opening 15a as stated before extend substantially over entire of the second arcuate section 24b. The opening 15a and the opening 17a collectively form a second opening of the present invention. These openings 15a and 17a are collectively referred to as a second opening 15A.

The rest of the circumferential wall section 30, that is, a section of the circumferential wall section other than the first and second arcuate sections 24a, 24b, forms a third arcuate section 24c. The third arcuate section 24c is twice as long as the first arcuate section 24a. The first arcuate section 24a and the third arcuate section 24c are adapted to close the third to fifth openings 5 to 7. For example, in the face air mode as shown in FIG. 6, the first arcuate section 24a closes the fourth opening 6, and the third arcuate section 24c closes the fifth opening 7. At this time, part of the third arcuate section 24c (one circumferential end of the circumferential wall section 30) is positioned along the inner wall of the duct 1 and has no relation to open and close the third to fifth openings 5 to 7.

In this embodiment, the circumferential wall section 30 extends from one end to the other end by an angle of 180 degrees, as described before. Actually, it is slightly greater than 180 degrees because the rotary door 9 may deviate during its operation.

The rotary door 9 is rotatably mounted within the duct 1 with the rotary shafts 16a of the end plates 16 being positioned at the center of curvature of the circumferential wall, where the fourth opening 5, the third opening 6 and the fifth opening 7 are arranged, by being journaled in the wall of the duct 1.

As shown in FIG. 1, a lever 21 is secured to one of the two rotary shafts 16a. One end of a control cable 22 is connected to one end of the lever 21, and the other end of the control cable 22 is connected to a blow mode selector means or lever (not shown) positioned in the passenger compartment of the vehicle. The rotary door 9 is rotated in directions (as shown by the arrows D and E) by controlling the blow mode selector lever. In this air flow selector 14, the fourth opening 5, the third opening 6 and the fifth opening 7 are open and closed depending on the position of the blow mode selector lever.

An operation of the embodiment is described. An air flows in the duct 1 in the directions shown by the arrows A, B and C in FIG. 1 when the blower 2 operates, as described before. Then, the air passes through the first opening 23 of the circumferential wall section 30 and enters the rotary door 9. Thereafter, the air is directed toward the second opening 15A of the circumferential wall section 30, passes through the third to fifth openings 5, 6 and 7, and reaches each outlet in the inside of the vehicle. At this time, the film element 15 is outwardly expanded under air pressure and pressed into sealing engagement with the peripheral edges of the fourth opening 5, the third opening 6, and the fifth opening 7. Since the rotating angle of the circumferential wall section 30 is approximately 180 degrees, the area of the first opening 23 for introducing air is maximized, the airflow resistance being thereby reduced.

In this embodiment, when the user operates the blow mode selector lever, the movement is directly transmitted to the rotary door 9 by the control cable 22 and the lever 21. The rotary door 9 is rotated in the direction shown by the arrow D or the arrow E. More specifically, the rotary door 9 is selectively moved to either one of the five blow mode positions shown in FIGS. 6 to 10. The blow mode selector lever is movable in the width direction of the vehicle. The movement of the blow mode selector lever with every equal pitch from the left side toward the right side of the vehicle selects a face air mode, a bilevel air mode, a foot air mode, a foot/defroster mode and a defroster mode in that order. In other words, the rotary door 9 is rotated in proportion to the amount of movement of the blow mode selector lever.

Each blow mode is described in more detail.

Firstly, the face air mode is described with reference to FIG. 6. When the blow mode selector lever is positioned leftmost in the width direction of the vehicle to select the face air mode, the second opening 15A of the rotary door 9 is completely aligned with the fourth opening 5. In this state, the first arcuate section 24a is positioned to face and close the third opening 6, and the third arcuate section 24c is positioned to face and close the fifth opening 7.

At this time, the first arcuate section 24a, the second arcuate section 24b (second opening 15A) and the third arcuate section 24c are positioned to face the fourth opening 6, the third opening 5, and the fifth opening 7, respectively. Part of the third arcuate section 24c is located along the inner wall of the duct 1 and has no relation to open and close the third to fifth openings 5 to 7.

In the following foot air mode, foot/defroster mode, and defroster mode, the first arcuate section 24a has no relation to open and close the third to fifth openings 5 to 7 and is rotated into the duct 1, the airflow area of the duct being thereby reduced. In the face air mode, however, the third to fifth openings 5 to 7 are positioned in this order so that the first arcuate section 24a will not be rotated into the duct 1, the airflow area of the duct being thereby maximized. In the face air mode, more air is introduced into passenger compartment than any of the other blow modes, when the same amount of the air is supplied by the blower 2. When the passenger compartment is rapidly cooled such as in the summer season, the largest amount of necessary cool air is introduced into the passenger compartment in the face air mode, and the passengers feel comfortable.

The air flows from the duct 1 into the rotary door 9 through the first opening 23 as shown by the arrow F1 and is directed to the face air duct 10 through the second opening 15A as shown by the arrow F2. Then, the air is discharged from the face air outlet. At this time, the film element 15 is outwardly expanded under air pressure and pressed into sealing engagement into the peripheral edges of the fourth and fifth openings 5 and 7 so as to completely close the fourth and fifth openings.

Figure 7:
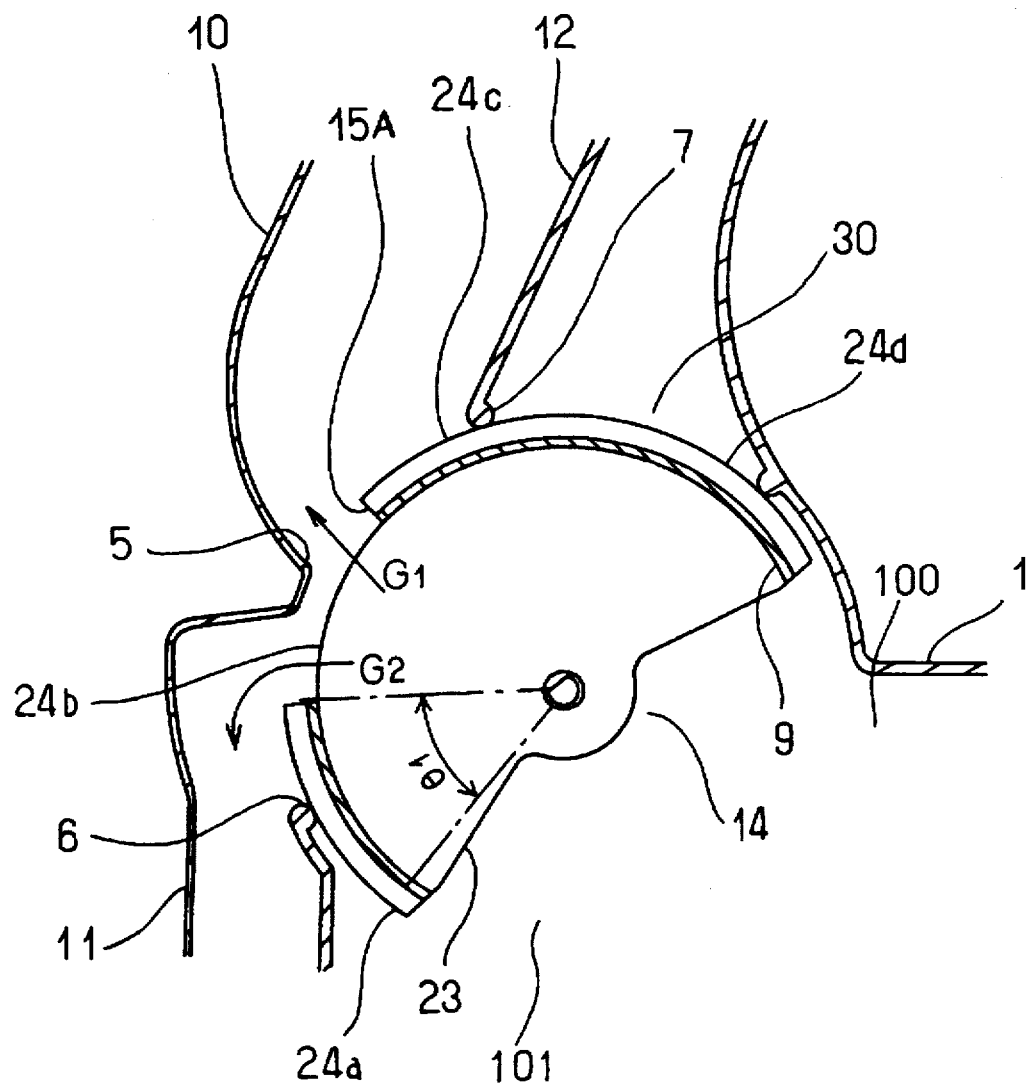
FIG. 7 is an operational view of the air duct selector in a bilevel air mode.

Next, the bilevel air mode, where the air is supplied into the passenger compartment through both the fourth and third openings 5 and 6, is described with reference to FIG. 7. The bilevel air mode is selected when the rotary door 9 is rotated in a counterclockwise direction by an angle of approximately ½θ1 degrees (corresponding to approximately half angle from one end to the other end of the first arcuate section 24a in the rotating direction of the rotary door 9 with the rotary shaft 16a as a center) from the face air mode shown in FIG. 6. One half of the second opening 15A faces the fourth opening 5, and the other half of the second opening 15A faces the third opening 6.

At this time, the fifth opening 7 is completely closed by the third arcuate section 24c. As shown in FIG. 7, about half of the first arcuate section 24a is rotated into the duct 1 and the airflow area of the duct 1 is slightly reduced.

In this way, the air within the duct 1 passes through the second opening 15A, enters the fourth and third openings 5 and 6 as shown by the arrows G1 and G2, and is discharged from the foot air outlet and the face air outlet. In the bilevel air mode, since the first arcuate section 24a reduces the airflow area of the duct 1 as described before, airflow resistance is slightly greater than the face air mode. Accordingly, the amount of the air supplied into the passenger compartment of the vehicle is slightly reduced when the same amount of the air is supplied by the blower 2. At this time, the film element 15 is pressed against the peripheral edge of the fifth opening 7 and closes the fifth opening 7.

Figure 8:
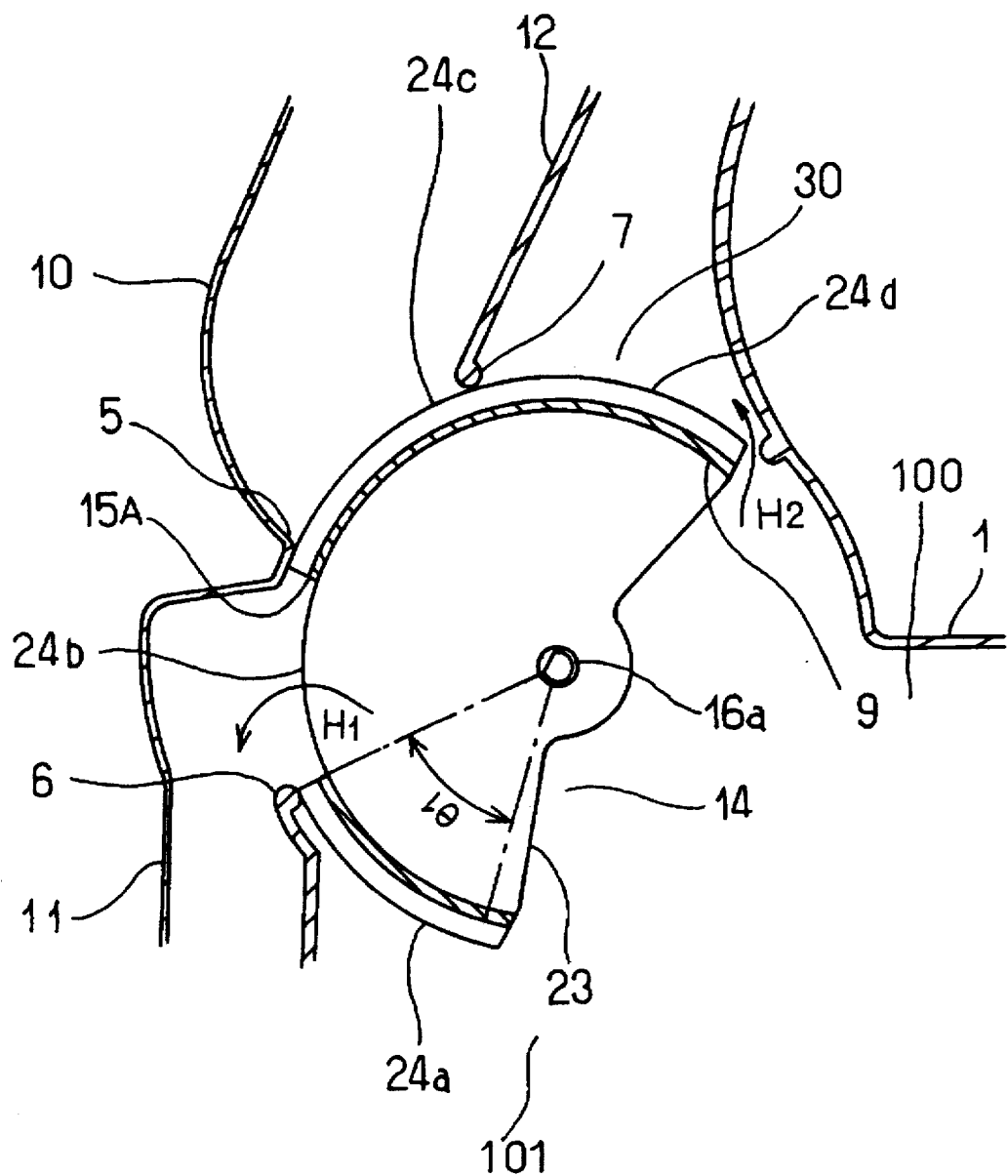
FIG. 8 is an operational view of the air duct selector in a foot air mode.

The foot air mode is described with reference to FIG. 8. The foot air mode is selected when the rotary door 9 is rotated in a counterclockwise direction by an angle of ½θ1 from the bilevel air mode. The second opening 15A is completely aligned with the third opening 6, and the third arcuate section 24c faces the fourth opening 5 and the fifth opening 7. In this embodiment, the third arcuate section 24c does not completely close the fifth opening 7, but leaves a predetermined gap so as to allow the air to flow from the duct 1 into the fifth opening 7 as shown in FIG. 8.

The maximum length of the fifth opening 7 is slightly greater than that of the fourth and third openings 5 and 6 as described before. The maximum length of the third arcuate section 24c is less than a sum of the maximum length of the fourth opening 5 and the maximum length of the adjacent fifth opening 7. As such, the third arcuate section 24c can not simultaneously close both the fourth and fifth openings 5 and 7 and part of the fifth opening 7 is still open. A slight amount of air is then introduced through the fifth opening 7. This is because the foot air mode is used mainly when the windshield or glass of the vehicle may be fogged due to low outside air temperature. To prevent the glass from being fogged, the air needs to be directed toward the inner surface of the windshield or glass. To this end, the maximum length of the fifth opening 7 is greater than that of any other opening. The foot air mode is effective to prevent the glass from being fogged. The amount of the conditioned air directed toward the windshield or glass can be adjusted by changing the maximum length of the fifth opening 7.

The first arcuate section 24a of the circumferential wall section 30 is rotated more deeply into the duct 1 in the foot air mode than in the bilevel air mode. The first arcuate section 24a is positioned so as to reduce the airflow area of the duct 1 and increase the airflow resistance. Thus, the amount of the air supplied into the passenger compartment of the vehicle is further reduced when the same amount of the air is supplied by the blower 2.

In this way, most of the air within the duct 1 is directed toward the foot air duct 13 through the second opening 6 as shown by the arrow H1. The rest of the air is directed toward the defroster air duct 12 through the third opening 7 as shown by the arrow H2.

The foot/defroster air mode is described with reference to FIG. 9. The foot/defroster air mode is selected when the rotary door 9 is rotated in a counterclockwise direction by an angle of ½θ1 from the foot air mode. The second opening 15A is positioned to open half of the third opening 6. The third arcuate section 24c is positioned to close the entire fourth opening 5 and half of the fifth opening 7.

When the rear end (right end in FIG. 9) of the circumferential wall section 30, that is, the third arcuate section 24c is positioned to open half of the fifth opening 7, the first arcuate section 24a has no relation to open and close the third to fifth openings 5 to 7 and is rotated fully away from the third opening 6 within the duct 1.

Figure 9:
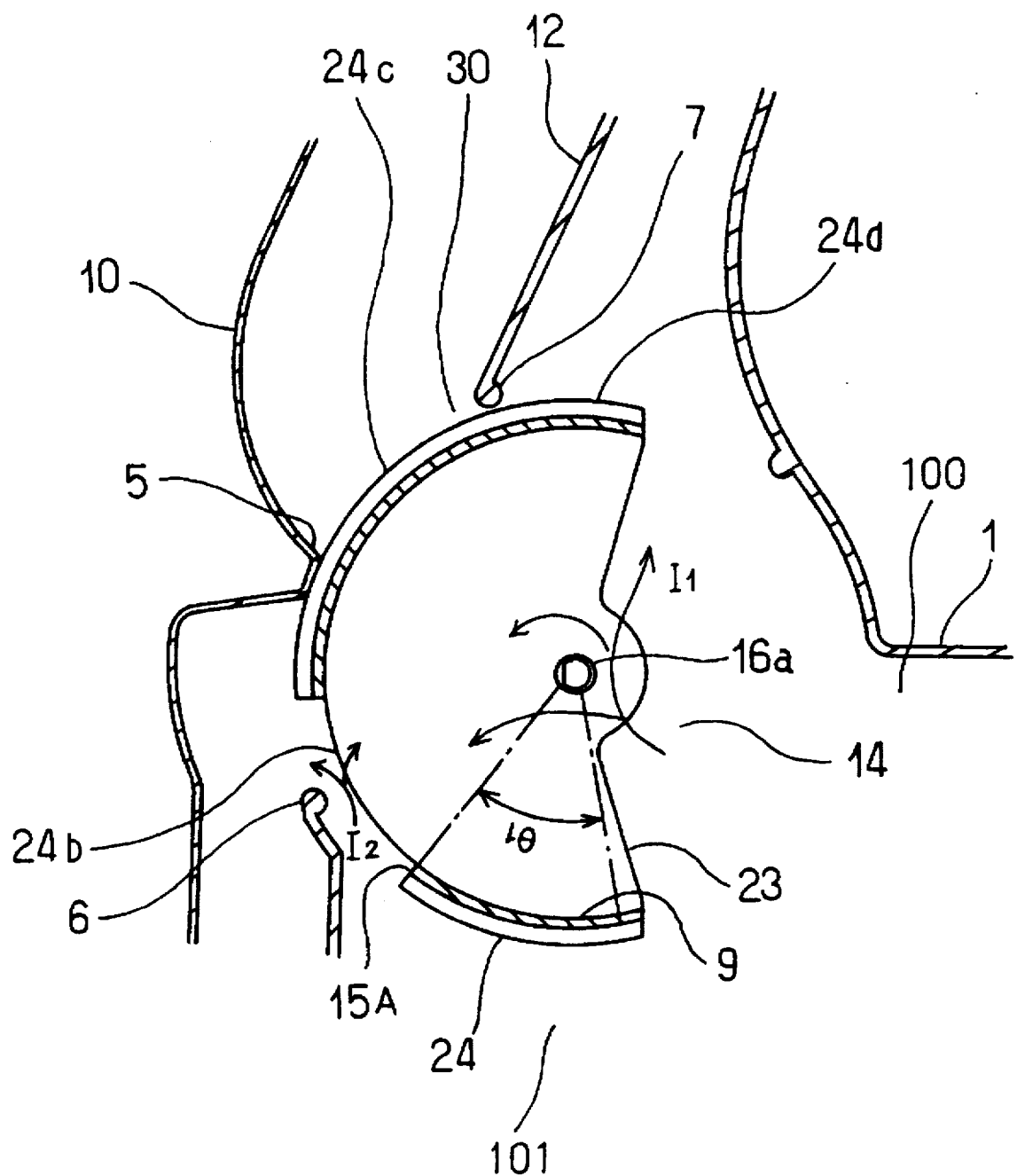
FIG. 9 is an operational view of the air duct selector in a foot/defroster air mode.

Although the air passage of the duct 1 is partly closed by the first arcuate section 24a in the foot/defroster air mode, the second opening 15A serves as an air inlet and is open at a position upstream of the third to fifth openings 5 to 7 when the rotary door 9 is rotated to an angular position shown in FIG. 9.

In this way, the air flows in the directions shown by the arrows I1 and I2. Part of the air shown by the arrow I1 flows along the right side of the drawing while bypassing the rotary door 9 and is directly introduced into the fifth opening 7. The other part of the air flows into the third opening 6 through the second opening 15A. The air shown by the arrow I2 passes through the second opening 15A. Part of this air flows along the inner surface of the circumferential wall section 30. The rest of the air is supplied into the third opening 6.

Finally, the defroster air mode is described with reference to FIG. 10. The defroster air mode is selected when the rotary door 9 is further rotated in a counterclockwise direction by an angle of ½θ1 from the foot/defroster air mode. The rear end of the circumferential wall section 30, that is, the third arcuate section 24c is positioned to completely open the fifth opening 7. The first arcuate section 24a has no relation to open and close the third to fifth openings 5 to 7. The first arcuate section 24a is rotated fully away from the third opening 6 and rotated much deeply into the duct 1.

More specifically, the third arcuate section 24c completely closes the third opening 6 and the fourth opening 5, whereas the fifth opening 7 is fully opened. The first arcuate section 24a is rotated into the center of the duct as shown in FIG. 10. The second opening 15A is fully open at an upstream of the first opening 23.

Figure 10:
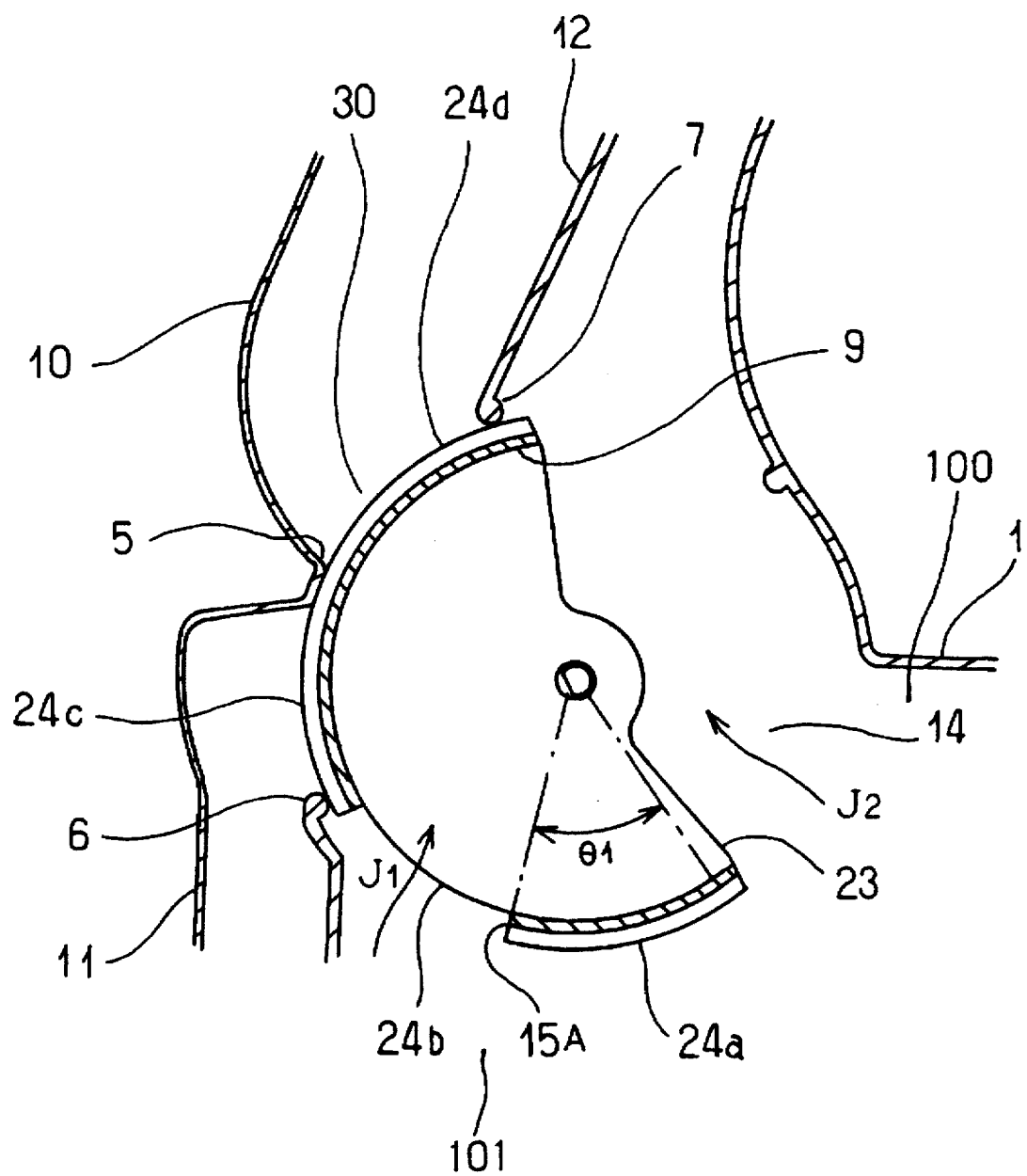
FIG. 10 is an operational view of the air duct selector in a defroster air mode.

In this way, the air flows along opposite sides of the first arcuate section 24a as shown by the arrows J1 and J2 in FIG. 10. Part of the air then passes through the second opening 15A, flows along the inner surface of the third arcuate section 24c, passes through the first opening 23, and is directed toward the fifth opening 7, as shown by the arrow J2. The other part of the air flows between the first arcuate section 24a and the right inner wall of the duct 1 which is located at the right side in FIG. 10, as shown by the arrow J2.

In this state, the airflow area of the duct 1 is substantially identical to that in the foot/defroster air mode and is the smallest. In the defroster air mode, most of the air indicated by the arrow J1 in FIG. 10 is warm air passing through the warm air passage 101. On the other hand, most of the air indicated by the arrow J2 is cool air passing through the cool air passage 100. The warm air flows along the inner surface of the third arcuate section 24c, and collides with cool air, thereby well mixed conditioned air being supplied.

The airflow area of the duct 1 in the face air mode, the bilevel air mode, and the foot air mode is gradually decreased in this order by the position of the first arcuate section 24a. However, as the rotary door 9 is rotated, the second opening 15A is gradually rotated into the duct 1 and then serves as an air inlet. The airflow area is prevented form being reduced and the airflow resistance can be prevented form being increased.

The rotary door 9 is rotated with every equal angle to selectively provide five different blow modes. As described before, the rotary door 9 can be rotated directly by moving the blow mode selector lever via the control cable 22. Mechanical structure of the air duct selector is simplified.

Although the present invention has been described with reference to the above embodiment, it may be modified as below.

In the following modifications, the rotary door differs in its structure from the previous embodiment. The identical or equivalent parts are given with the same reference numerals.

Figure 11:
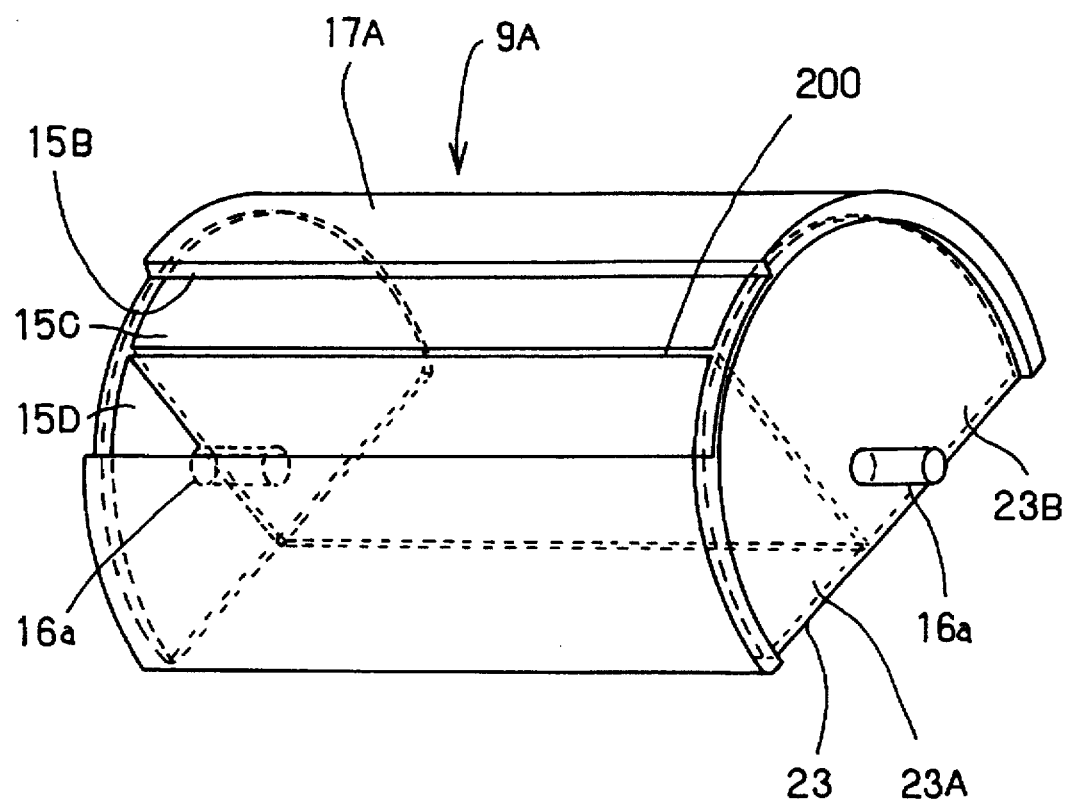
FIG. 11 is a perspective view of a modification of the rotary door.

FIG. 11 is a perspective view illustrating a rotary door 9A entirely. The rotary door 9A is formed in a half cylindrical shape, which is halved along a longitudinal direction and includes opposite end plates 16 and an circumferential wall 17A in the same way as the rotary door 9 in the previous embodiment. A rotary shaft 16a is integrally formed with the end plate 16.

The circumferential wall 17A includes a single second opening 15B in a position corresponding to the second opening 15A. In this embodiment, the film element 15 is not used. No film element is attached to the circumferential wall at a position corresponding to the mounting portion 18. The second opening 15B in this embodiment functions as the second opening 15A in the previous embodiment.

A guide portion 200 is integrally formed with the circumferential wall 17A so as to extend from the first opening 23 toward the second opening 15B. The guide portion 200 is shifted so as to avoid the circumferential wall 17A or the center of curvature of the circumferential wall 17A along a line from the top of the circumferential wall 17A to the rotary shaft 16a, i.e., the rotary shaft 16a, for the reasons described later.

In this embodiment, the end plate 16, the rotary shaft 16a, the circumferential wall 17A and the guide portion 200 are integrally formed by an upper die and a lower die. The upper die is located in the outer side of the circumferential wall 17A. The lower die is located within the circumferential wall 17A. As such, if the guide portion 200 is not formed in the position as described before, it would be difficult to release the rotary door 7A from the dies. Even if the rotary door 7A can be released from the dies, the larger number of dies is required, manufacturing the rotary door 7A being thereby difficult. The guide portion 200 extends from the first opening 23 toward the second opening 15B. The tip end of the guide portion 200 divides the second opening 15B into two sections, that is, a second opening section 15C and a second opening section 15D. The first opening 23 is also divided by the guide portion 200 into a first opening section 23A and a first opening section 23B.

In the rotary door 9A, a first passage 201 for communicating between the first opening section 23A and the second opening section 15D, and a second passage 202 for communicating between the first opening section 23B and the second opening section 15C are formed.

An operation of the guide portion 200 is described with reference to FIGS. 12 to 14.

Figure 12:
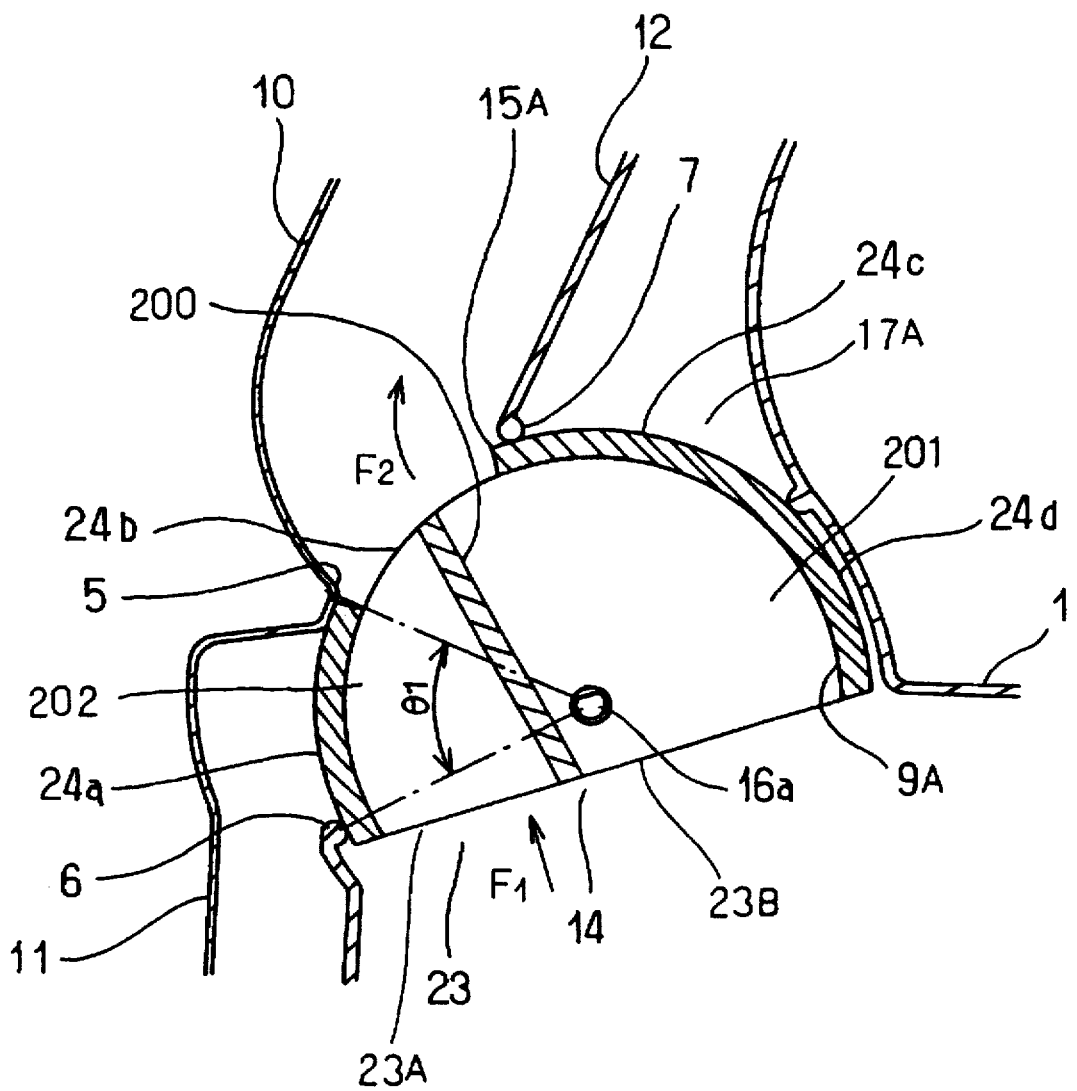
FIG. 12 is an operational view of the rotary door shown in FIG. 11.

FIG. 12 shows the rotary door 9a in the face air mode.

In this case, the guide portion 200 is located in the same direction as the air flows into the rotary door 9A, as shown in FIG. 12. In the face air mode, the largest amount of air flows as described before. Therefore, when the guide portion 200 is mounted within the rotary door 9A, the airflow resistance is minimized.

Figure 13:
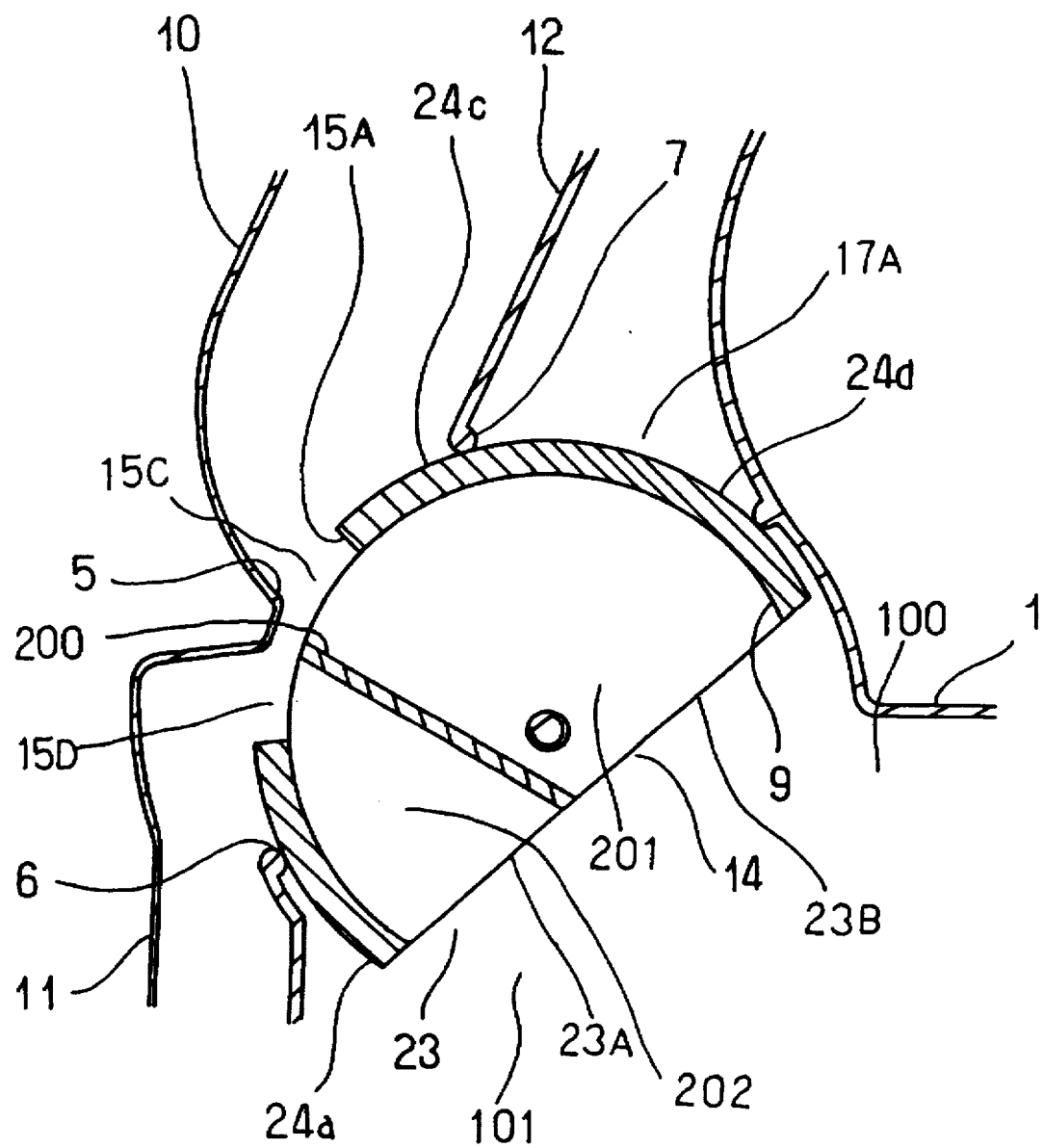
FIG. 13 is another operational view of the rotary door shown in FIG. 11.

FIG. 13 shows the rotary door 9A in the bilevel air mode.

In this case, the tip end of the guide portion 200 faces the edge portion as the boundary between the third opening 6 and the fourth opening 5. The guide portion 200 separates the cool air passage 100 and the warm air passage 101. In this way, the second opening section 15C faces the fourth opening 5, and the second opening section 15D faces the third opening 6. As shown in FIG. 13, the first opening section 23B is open to the cool air passage 100, and the first opening section 23A is open to the warm air passage 101.

Accordingly, the cool air tends to flow into the first passage 201. The fourth opening 5 mainly receives the cool air. The warm air tends to flow into the second passage 202. The third opening 6 mainly receives the warm air. As a result, the temperature of the conditioned air supplied from the fourth opening 5 is different from that supplied from the third opening 6.

The bilevel air mode is mainly selected in an intermediate season such as spring or fall. Ideally, the head of the passenger is cooled, whereas the feet is warmed. To this end, a cool air is discharged from the fourth opening 5 or the face air outlet, and a warm air is discharged from the third opening 6 or the foot air outlet.

Figure 14:
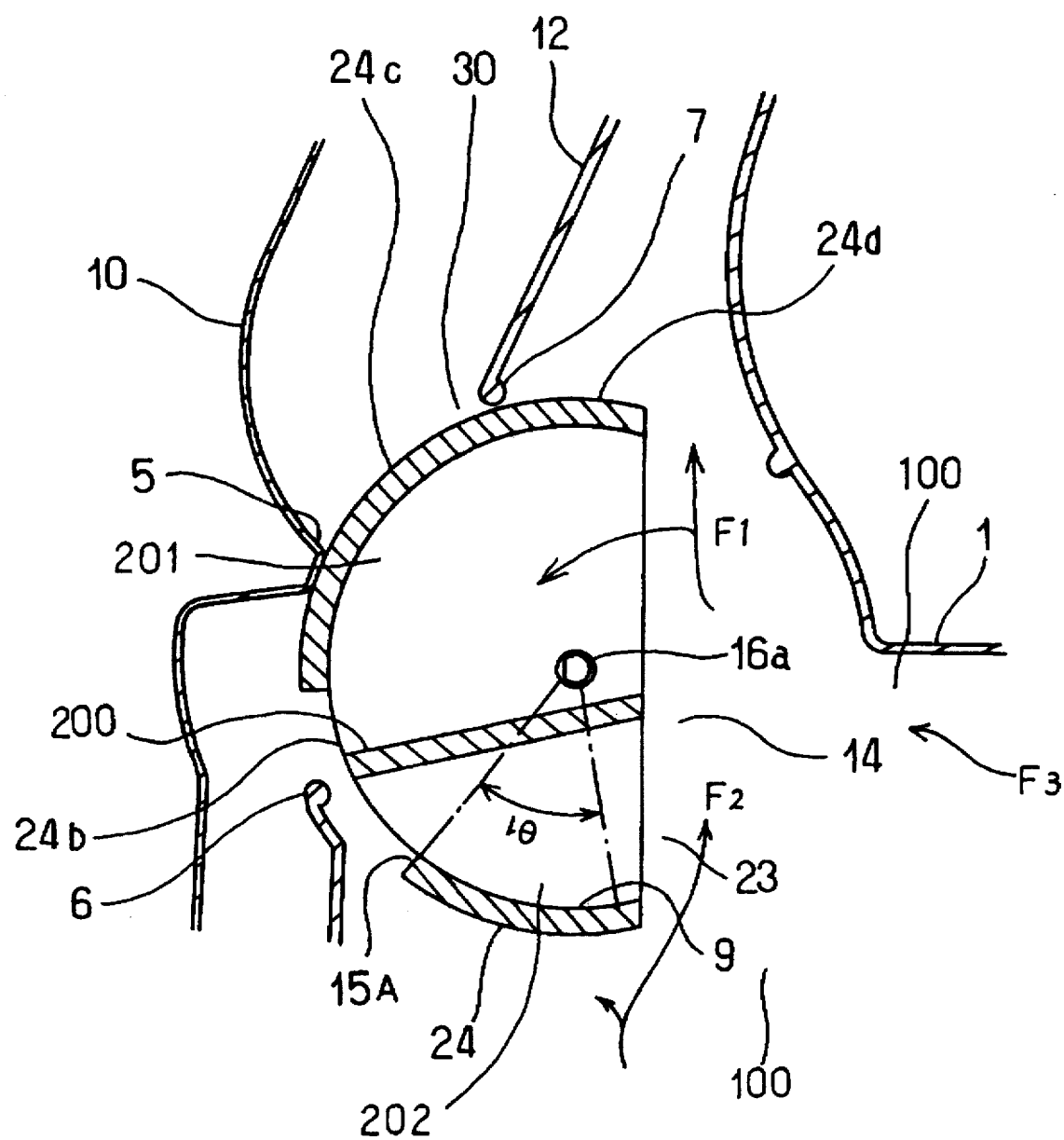
FIG. 14 is still another operational view of the rotary door shown in FIG. 11.

FIG. 14 shows the rotary door 9A in the foot/defroster air mode.

In this case, the tip end of the guide portion 200 faces the edge of the third opening 6. In this way, an air flows within the duct 1 in the directions as shown by the arrows F1 to F3 in FIG. 13. The air indicated by the arrow F3 is a cool air which has passes through the cool air passage 100. The air indicated by the arrow F2 is a warm air which has passed through the warm air passage 101. Most of the warm air flows near the upstream end (lower end) of the rotary door 9A. However, some part of the warm air is directed toward the second opening 15A. The cool air indicated by the arrow F1 and the warm air indicated by the arrow F2 are mixed at the right side of the rotary door 9A. Part of the mixture is directed toward the fifth opening 7 as indicated by the arrow F1. The other part of the mixture flows along the inner surface of the circumferential wall 17 and is then directed toward the third opening 6.

Accordingly, the temperature of the conditioned air supplied from the third opening 6 is substantially equal to that supplied from the fifth opening 7. That is, the cool air tends to flow into the fifth opening 7. Thus, a comparatively low temperature conditioned air is discharged from the defroster air outlet. As a result, the vehicle glass could not effectively be prevented from being fogged.

However, as described before, the warm air and the cool air are well mixed by the guide portion 200 in this embodiment. The mixture of the conditioned air is directed to the fifth opening 7, the fog on the glass being thereby effectively prevented.

In the embodiment, the opening 15a is composed of a plurality of opening 15b, but may be a single opening.

Also, the film element 15 is mounted on the circumferential wall 17 of the rotary door 9 and expanded outwardly under air pressure so as to seal the edges of the third to fifth openings 5 to 7. However, a resiliently deformable seal may, for example, be directly attached to the circumferential wall 17 to provide a seal with the edges or the other method may be applied.

In the foregoing embodiment, the third to fifth openings 5 to 7 are positioned in this order from the left to the right sides of the duct. However, the third opening 6 and the fifth opening 7 may be exchanged each other, and the second opening 15a may be formed on a half of the third arcuate section 24c.

In the foregoing embodiment, the maximum length of the fifth opening 7 is greater than that of the fourth opening 5 by a predetermined length. However, the fifth opening 7 and the fourth opening 5 may have the same length.

The blow mode selector lever directly moves the control cable 21 to drive the rotary door. However, the other driving system, for example, an electric switch and a separate actuator such as a motor operated by the switch to drive the rotary door.

The present invention is not limited to the foregoing embodiments. The present invention is not only applicable to an automotive air conditioner, but also to various devices for opening and closing air ducts. Various modifications may be made without departing from the spirit and scope of the invention.

What is claimed is:

1. An air duct selector comprising:

a casing having air ducts therein;

a rotary shaft rotatably supported by said casing;

a rotary door connected to said rotary shaft and being formed in a substantially arcuate shape, said rotary door including a first opening defined by opposite circumferential open ends, and a second opening formed in an arcuate circumferential wall; and drive means for rotating said rotary shaft; wherein, said casing includes a third opening, a fourth opening and a fifth opening formed at a downstream end thereof and contiguously arranged along a circumferential surface of said rotary door, said rotary door being rotated to adjust opening areas of said third, fourth and fifth openings, when said rotary door is rotated in a direction from said fifth opening toward said third opening and in a predetermined rotated position where one of said circumferential ends of said circumferential wall located at a rear end of said rotary door passes at least part of said fifth opening and opens said fifth opening, an air flows into said second opening and is directed toward said fifth opening through said first opening.

2. An automotive air conditioner for selectively opening at least three outlets to direct a conditioned air toward different sections in a passenger compartment of a vehicle, said automotive air conditioner comprising:

a casing for directing said conditioned air into said passenger compartment;

a rotary shaft rotatably supported by said casing;

a rotary door connected to said rotary shaft and formed in a substantially arcuate shape, said rotary door including a first opening defined by circumferential open ends, and a second opening defined by an arcuate circumferential wall; and drive means for rotating said rotary shaft; wherein said casing includes a third opening, a fourth opening, and a fifth opening formed in a downstream end thereof and contiguously arranged along a circumferential surface of said rotary door, said third, fourth and fifth openings communicating with said three outlets, respectively, and opening areas of said third, fourth and fifth openings being adjusted by said rotary door; and when said rotary door is rotated in a direction from said fifth opening toward said third opening and in a predetermined rotated position where one of said circumferential ends of said circumferential wall located at a rear end of said rotary door passes at least part of said fifth opening and opens said fifth opening, an air flows into said second opening and is directed toward said fifth opening through said first opening.

3. An automotive air conditioner according to claim 2, wherein said rotary door opens at least part of said fifth opening and closes at least one of said third and fourth openings in said predetermined rotated position.

4. An automotive air conditioner according to claim 2, wherein said casing includes a bypass passage for introducing said conditioned air into said fifth opening without passing said rotary door when said rotary door is in said predetermined rotated position.

5. Automotive air conditioner according to claim 4, wherein said bypass passage is defined by an inner peripheral surface of said circumferential wall and an inner peripheral wall of said casing.

6. An automotive air conditioner according to claim 4, wherein each of maximum lengths of said third, fourth, and fifth openings in the rotating direction of said rotary door is substantially equal to the maximum length of said second opening.

7. An automotive air conditioner according to claim 6, wherein a length of said circumferential wall of said rotary door in the rotating direction of said rotary door is substantially four times as long as the maximum length of said second opening, said circumferential wall is divided into four sections between one end and the other end so as to include a first arcuate section and a second arcuate section from said one end, and said second opening is substantially formed on an entire surface of said second arcuate section.

8. An automotive air conditioner according to claim 2, wherein said third opening is adapted to direct the conditioned air toward the lower part of a passenger, said fourth opening is adapted to direct the conditioned air toward the upper part of the passenger, and said fifth opening is adapted to direct the conditioned air toward the inner surface of a windshield glass.

9. An automotive air conditioner according to claim 7, wherein said maximum length of said fifth opening in the rotating direction of said rotary door is greater than the maximum length of said third and fourth openings by a predetermined length.

10. An automotive air conditioner according to claim 2, wherein an rotating angle of said rotary door from one end to the other end with said rotary shaft as a center is approximately 180 degrees.

11. An air duct selector or automotive air conditioner according to claim 9, wherein said casing includes a cool air passage for a cool air, and a warm air passage juxtaposed with said cool air passage for a warm air, said third opening, said fourth opening, said fifth opening, and said rotary door are located at a downstream side of said cool air passage and said warm air passage, and a guide portion formed on said inner surface of said circumferential wall of said rotary door for partitioning said cool air passage and said warm air passage in a bilevel air mode where said rotary door opens both said third and fourth openings.

12. An automotive air conditioner according to claim 11, wherein said guide portion extends in substantially the same direction as the air flows into said rotary door when said rotary door is in a face air mode where said rotary door opens said fourth opening and closes said third and fifth openings.

13. An automotive air conditioner according to claim 11, wherein said guide portion is integrally formed with said rotary door.

14. An automotive air conditioner according to claim 2, further comprising a control cable and a blow mode selector lever located in the passenger compartment and connected to said control cable, said blow mode selector lever being adapted to rotate said rotary door with every equal amount so as to select a predetermined air supply mode.

* * * * *